(12) United States Patent
Schaaf et al.

(10) Patent No.: US 7,544,132 B2
(45) Date of Patent: Jun. 9, 2009

(54) CONSTANT-VELOCITY FIXED JOINT

(75) Inventors: Gregor Schaaf, Cremlingen (DE); Gerhard Kaiser, Isenbüttel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 11/960,818

(22) Filed: Dec. 20, 2007

(65) Prior Publication Data

US 2008/0161118 A1 Jul. 3, 2008

Related U.S. Application Data

(63) Continuation of application No. PCT/EP2006/005613, filed on Jun. 12, 2006.

(30) Foreign Application Priority Data

Jun. 21, 2005 (DE) .................. 10 2005 029 042

(51) Int. Cl.
*F16D 3/00* (2006.01)

(52) U.S. Cl. ................. 464/145; 464/906; 464/146

(58) Field of Classification Search ............ 29/898.067; 464/15, 140, 145, 146, 906
See application file for complete search history.

(56) References Cited

U.S. PATENT DOCUMENTS

| | | | |
|---|---|---|---|
| 3,324,682 A | 6/1967 | Bendler | |
| 5,167,584 A | 12/1992 | Krude | |
| 6,299,543 B1 * | 10/2001 | Sone et al. | 464/146 |
| 6,332,844 B1 * | 12/2001 | Hayama et al. | 464/145 |
| 6,383,082 B1 * | 5/2002 | Declas | 464/145 |
| 6,506,122 B2 * | 1/2003 | Nakagawa et al. | 464/145 |
| 6,893,352 B2 | 5/2005 | Jacob et al. | |
| 7,097,567 B2 * | 8/2006 | Kobayashi et al. | 464/145 |
| 7,153,213 B2 * | 12/2006 | Sone et al. | 464/145 |
| 7,258,616 B2 * | 8/2007 | Kobayashi et al. | 464/145 |
| 7,357,724 B2 * | 4/2008 | Nakagawa et al. | 464/145 |
| 7,413,515 B2 * | 8/2008 | Nakagawa et al. | 464/146 |
| 7,419,433 B2 * | 9/2008 | Nakagawa et al. | 464/145 |
| 7,431,653 B2 * | 10/2008 | Mochinaga et al. | 464/146 |
| 2003/0054893 A1 | 3/2003 | Thomas | |
| 2005/0079918 A1* | 4/2005 | Kobayashi et al. | 464/145 |
| 2005/0261065 A1* | 11/2005 | Nakagawa | 464/145 |

FOREIGN PATENT DOCUMENTS

| | | |
|---|---|---|
| DE | 1298785 A1 | 7/1969 |
| DE | 19514868 C1 | 5/1996 |

(Continued)

*Primary Examiner*—Aaron M Dunwoody
(74) *Attorney, Agent, or Firm*—Manfred Beck, P.A.

(57) ABSTRACT

A constant-velocity fixed joint includes an outer joint part with ball raceways and an inner joint part with ball raceways which are separated by webs. A cage, which is disposed between the outer joint part and the inner joint part, has windows for holding balls. The inner joint part can be inserted into the cage only when at least one of its webs engages in a window in the cage. As a result of certain ratios of the raceway angle to the web angle, a high resistance to fracturing at large deflection angles is achieved and a weakening at the functional faces of the inner joint part is avoided. The large angle of wrap around the balls at the ends of the raceways is advantageous for the load bearing capacity of the raceways. Due to its simple form, the cage can be manufactured with a small thickness.

14 Claims, 4 Drawing Sheets

FOREIGN PATENT DOCUMENTS

| | | |
|---|---|---|
| DE | 10032853 A1 | 1/2002 |
| DE | 10253627 A1 | 7/2003 |
| DE | 10260172 A1 | 11/2004 |
| EP | 0571551 B1 | 3/1999 |
| EP | 1296079 A1 | 3/2003 |

\* cited by examiner

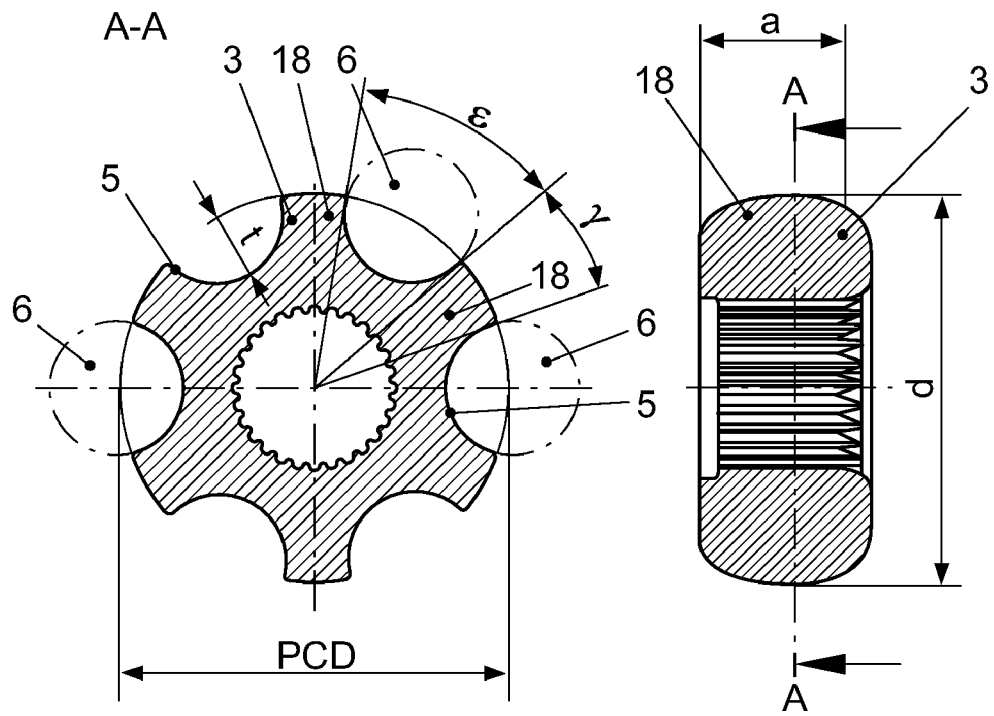
FIG. 3
FIG. 4
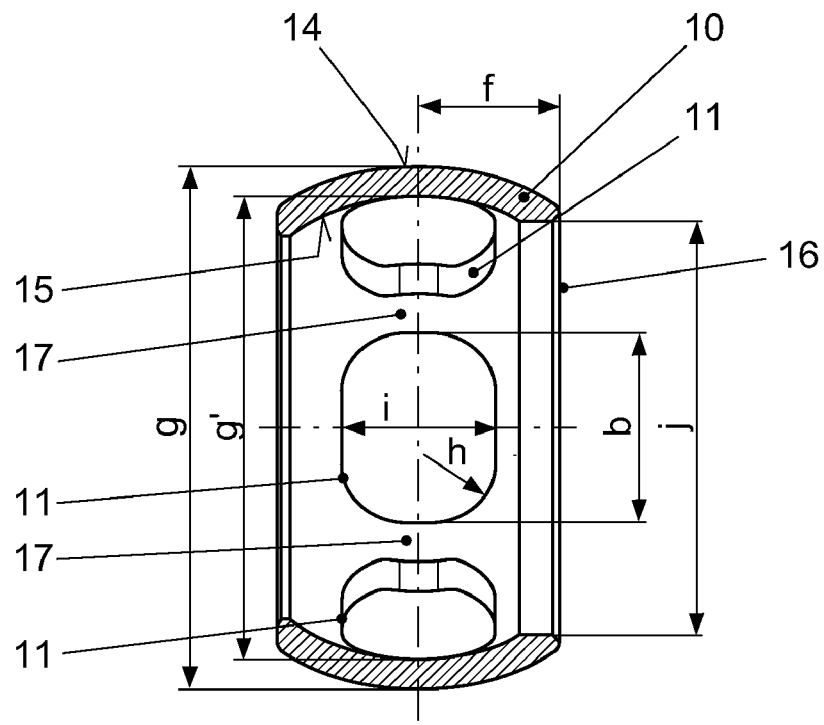
FIG. 5

CONSTANT-VELOCITY FIXED JOINT

CROSS-REFERENCE TO RELATED APPLICATIONS

This application is a continuation, under 35 U.S.C. § 120, of copending International Application No. PCT/EP2006/005613, filed Jun. 12, 2006, which designated the United States; this application also claims the priority, under 35 U.S.C. § 119, of German Patent Application No. DE 10 2005 029 042.6, filed Jun. 21, 2005; the prior applications are herewith incorporated by reference in their entirety.

BACKGROUND OF THE INVENTION

Field of the Invention

The invention relates to a constant-velocity fixed joint, including an outer joint part which has ball raceways at its inner periphery, an inner joint part which has ball raceways, which are separated by webs, at its outer periphery, with the ball raceways of the outer joint part and of the inner joint part being disposed opposite one another in pairs, the constant-velocity fixed joint further including balls which are held in the raceway pairs, and a cage which is disposed between the outer joint part and the inner joint part and has windows for holding the balls, wherein at least one of the webs of the inner joint part can be inserted into a window of the cage in order to facilitate the assembly of the constant-velocity fixed joint.

Constant-velocity fixed joints of this type are used for example in side shafts of motor vehicles.

In constant-velocity fixed joints, the angle of wrap, that is to say the angle range in which a torque-transmitting ball is surrounded by the associated ball raceway, varies greatly along the length of the raceway. At large deflection angles of the joint, the balls reach the edge regions of the raceways. In these edge regions, the distribution of the angle of wrap around the balls between the inner part and the outer part is usually highly non-uniform. A small angle of wrap by a raceway of the inner part matches up with a large angle of wrap by the corresponding raceway of the outer part and vice versa.

When transmitting high torques at large deflection angles, the balls cannot be held sufficiently in raceway regions with a small angle of wrap. Plastic deformation is in fact generated here, with material being displaced in the radial direction. This material hinders the mobility of the cage. This can lead to jamming and as a result to breakage of the cage.

Joints having a raceway without an undercut, at which the raceway ends at the opening side of the joint parallel to the central axis of the inner part or outer part, are characterized by favorable production properties and are also suitable for large deflection angles of greater than 48 degrees. In joints of this type, however, the distribution, as explained above, of the angle of wrap between the inner part and the outer part is however particularly unfavorable.

German Patent Application Publication No. DE 102 60 172 A1 proposes a constant-velocity fixed joint in which the angle of wrap around the torque-transmitting balls in the critical edge regions of the ball raceways is improved. For this purpose, at the end sections of the raceways which are curved toward the component central axis, the radius of curvature is increased in relation to conventionally used raceway shapes. This permits constant-velocity fixed joints with deflection angles of 48 degrees and more which have a high resistance to breakage at high deflection angles and are of very compact construction.

The configuration of the raceways has an effect on the configuration of the cage, since the balls may not migrate out of the cage windows during the movement along the raceways in the radial direction. Small radial travels permit thin cages, with which the problem of strength then again becomes important, for which primarily the configuration of the window and of any additional assembly recesses which are provided is of significance.

The latter are provided on the cage in order to permit the assembly with the inner joint part and the outer joint part, and the insertion of the balls.

The above-mentioned requirements or constraints result in demands which are to some extend in conflict with one another and cannot be brought in line with one another easily.

SUMMARY OF THE INVENTION

It is accordingly an object of the invention to provide a constant-velocity fixed joint which overcomes the above-mentioned disadvantages of the heretofore-known constant-velocity fixed joints of this general type. It is in particular an object of the invention to permit a simple assembly of the inner joint part and the cage.

The constant-velocity fixed joint according to the invention takes as its starting point a constant-velocity fixed joint as specified in the introduction with the goal of permitting simple assembly of the inner joint part and the cage without adversely affecting the functional faces with regard to the above-explained problems.

Here, the invention is based on the principle of pivoting the inner joint part into the cage, since both are provided with corresponding ball faces which engage into one another in the assembled state and preclude axial assembly. For this purpose, in order to insert the inner joint part into the cage, at least one of the webs of the inner joint part is placed at least partially into engagement with a window of the cage, whereupon sufficient play is available to superpose the center of the outer ball shape of the inner joint part with the center of the inner ball shape of the cage. In this position, in which the web has already passed out of engagement with the window again, the axis of the inner joint part can then be aligned with respect to the axis of the cage.

This approach is in general described inter alia in examined and published German Patent Application No. DE 1 298 785 A and corresponding U.S. Pat. No. 3,324,682 and German Patent No. DE 195 14 868 C1. In order to permit an insertion of a web into a cage window, it is possible to correspondingly expand at least one cage window. This would however reduce the load capacity of the cage. In the case in particular of thin cages, this again leads to a reduced breaking strength of the joint at large deflection angles. Examined and published German Patent Application No. DE 1 298 785 A and corresponding U.S. Pat. No. 3,324,682 and German Patent No. DE 195 14 868 C1 therefore propose measures on the side of the inner joint part, so that the windows on the cage remain small. According to examined and published German Patent Application No. DE 1 298 785 A and corresponding U.S. Pat. No. 3,324,682, one of the webs is shortened in the axial direction, so that this web fits into a cage window. This is however associated with a weakening at the respective raceway on the inner joint part if the raceways are again utilized all the way to the original edge region. Otherwise, a reduced maximum deflection angle results. In addition, an imbalance is generated in the joint. In addition, when shortening only one web, precise positioning must take place during assembly, which entails an increased amount of handling. According to German Patent No. DE 195 14 868 C1, the axial length of a web on the inner joint part is not shortened, but rather the web is provided with a chamfer, so that the web can engage at least partially into a cage window. However, this also results in a weakening of the respective raceways, since in this region, the angle of wrap around the balls decreases if a relatively intense curvature of the ball raceway is not provided there.

Further, European Patent Specification No. EP 0 571 551 B1 and corresponding U.S. Pat. No. 5,167,584 disclose reducing the width of the inner joint part through the use of chamfers which are provided along the axial edges of at least one ball raceway, so that the inner joint part can be inserted into the cage in a state pivoted by 90°. As a result of this, however, the angle of wrap around the respective ball and therefore the load capacity of the ball raceway is weakened.

Also possible is the formation of assembly recesses on the cage itself, as is proposed for example in German Patent Application Publication No. DE 100 32 853 A1 and corresponding U.S. Pat. No. 6,893,352 or German Patent Application Publication No. DE 102 53 627 A1. In addition to a weakening of the cage, this also entails an increased production expenditure for the cage. This is not practicable in the case of thin cages.

Against this background, other measures are accordingly necessary in order to avoid weakening of the functional faces of the joint.

With the foregoing and other objects in view there is provided, in accordance with the invention, a constant-velocity fixed joint, including:

an outer joint part having an inner periphery, the outer joint part having ball raceways provided at the inner periphery;

an inner joint part having an outer periphery defining an imaginary inner part outer diameter and an inner joint part axis, the inner joint part having ball raceways provided at the outer periphery and having webs separating the ball raceways of the inner joint part at the outer periphery from one another;

the ball raceways of the outer joint part and the ball raceways of the inner joint part being disposed opposite one another for forming raceway pairs;

balls having respective balls centers and ball diameters, the balls being held in the raceway pairs;

a cage disposed between the outer joint part and the inner joint part, the cage having windows formed therein for holding the balls;

the inner joint part and the cage being configured such that at least one of the webs of the inner joint part can be inserted into one of the windows of the cage for assemblability;

the joint inner part, when not deflected, being configured to meet the following conditions in a plane intersecting the ball centers:

for PCD at most 62 mm: $\epsilon/\gamma$ greater than 1.6, and
for PCD greater than 62 mm: $\epsilon/\gamma$ greater than 1.8, with
PCD being a pitch circle diameter through the ball centers;
$\epsilon$ being an angle enclosing one of the ball raceways of the inner joint part between points of intersection of one of the ball diameters with the imaginary inner part outer diameter with respect to a point of intersection of the inner joint part axis and the plane intersecting the ball centers; and
$\gamma$ being an angle enclosing one of the webs between points of intersection of corresponding ones of the ball diameters with the imaginary inner part outer diameter with respect to the point of intersection of the inner joint part axis and the plane intersecting the ball centers.

In other words, according to the invention, there is provided a constant-velocity fixed joint, including:

an outer joint part which has ball raceways at its inner periphery;

an inner joint part which has ball raceways, which are separated by webs, at its outer periphery, with the ball raceways of the outer joint part and of the inner joint part being disposed opposite one another in pairs;

balls which are held in the raceway pairs; and a cage which is disposed between the outer joint part and the inner joint part and has windows for holding the balls, wherein, for the purpose of assemblability, at least one of the webs of the inner joint part can be inserted into a window of the cage, and wherein, when the joint is not deflected, in a plane E which intersects the ball centers, the following condition is adhered to at the inner joint part:

for PCD less than or equal to 62 mm: $\epsilon/\gamma$ greater than 1.6; and for PCD greater than 62 mm: $\epsilon/\gamma$ greater than 1.8, wherein:

PCD is the pitch circle diameter through the ball center points;

$\epsilon$ is the angle (raceway angle) which encloses the raceway between the points of intersection of the ball diameter with the imaginary inner part outer diameter in relation to the joint axis point of intersection of the plane E; and $\gamma$ is the angle (web angle) which encloses the web between the points of intersection of the ball diameter with the imaginary inner part outer diameter with respect to the joint axis point of intersection of the plane E.

According to the invention, a constant-velocity fixed joint having the features as defined above is proposed for the purpose of avoiding a weakening of the functional faces of the joint. It has specifically been proven that the above-explained demands can be allowed for by adhering to the conditions defined above.

In this way, constant-velocity fixed joints are obtained which have a high strength at large deflection angles, are of very compact construction and have a design which is favorable in terms of production and assembly.

According to another feature of the invention, the inner joint part is configured to meet the following conditions:

for PCD at most 62 mm: t/d is greater than 0.16, and
for PCD greater than 62 mm: t/d is greater than 0.168, where:

PCD is the pitch circle diameter through the ball centers; t is a depth of the ball raceways of the inner joint part; and d is an outer diameter of the inner joint part.

According to another feature of the invention, the cage has an outer diameter and has an edge on an assembly side thereof; the windows of the cage have respective centers; the cage is configured such that an axial spacing of the centers of the windows from the edge of the cage on the assembly side in relation to the outer diameter of the cage is such that: f/g is greater than 0.275, where f is the axial spacing of the centers of the windows from the edge of the cage on the assembly side; and g is the outer diameter of the cage.

According to another feature of the invention, the windows of the cage have an axial length and are formed with a radius of rounding; the cage is configured to meet the following conditions:

for PCD at most 62 mm: h/i is greater than 0.4, and for PCD greater than 62 mm: h/i is greater than 0.46, where PCD is the pitch circle diameter through the ball centers; h is the radius of rounding of the windows of the cage; and i is the axial length of the windows of the cage.

According to another feature of the invention, the cage has an opening diameter j on an assembly side thereof; and the inner joint part has an outer diameter d such that d/j is greater than 1.11.

According to another feature of the invention, the cage has an outer spherical face and an inner spherical face defining respective sphere center points such that the sphere center points have an axial offset.

According to another feature of the invention, the raceway pairs form a one-sided opening angle.

According to another feature of the invention, the inner joint part has a joint opening side; the ball raceways of the inner joint part have sections with respective different curvatures merging into one another; the sections of the ball raceways of the inner joint part include an end section with a given raceway profile; and the given raceway profile extends in a direction toward the joint opening side such that the given raceway profile lies between an imaginary axially parallel profile and an imaginary circular arc about a point on the inner joint part axis.

According to another feature of the invention, the cage has a wall thickness of less than 25% of the ball diameters, preferably less than 21%, of the ball diameters.

According to another feature of the invention, the cage defines a guide plane for the balls, the cage has a cage outer diameter and a cage inner diameter; and a ratio of the cage outer diameter to the cage inner diameter in the guide plane for the balls is less than 1.15.

According to another feature of the invention, the outer joint part, the inner joint part, the cage and the balls form a six-ball joint configured to meet the following conditions:

for PCD greater than 63 mm: $(PCD+d_K)/d_K < 4$, and for PCD at most 63 mm: $(PCD+d_K)/d_K < 4.25$, where $d_K$ is a ball diameter; and PCD is the pitch circle diameter through the ball centers.

According to another feature of the invention, the outer joint part defines an outer joint part axis and a joint opening side; the ball raceways of the outer joint part have sections with respective different curvatures merging into one another; the sections of the ball raceways of the outer joint part include an end section opposite the joint opening side; and the end section has a given raceway profile configured such that the given raceway profile lies between an imaginary axially parallel profile and an imaginary circular arc about a point on the outer joint part axis.

According to another feature of the invention, the outer joint part and the inner joint part have a maximum deflection angle in operation of greater than 50°.

As mentioned above, according to an advantageous embodiment, the following condition is adhered to at the inner joint part:

for PCD less than or equal to 62 mm, t/d is greater than 0.16; and for PCD greater than 62 mm, t/d is greater than 0.168;

where PCD is the pitch circle diameter through the ball center points, t is the depth of the raceway, and d is the outer diameter of the inner joint part. This results, on the one hand, in the possibility of configuring all the webs in the same manner with a sufficient functional face. On the other hand, the load capacity of the cage can be increased, since the axial length of the cage on the assembly side can be increased.

The cage is preferably free from insertion grooves for the inner joint part. Weakenings of the cage are avoided in this way, and the cage can thus be configured to be relatively thin. In addition, an additional machining expenditure on the side of the cage is dispensed with.

In an advantageous embodiment, all the webs additionally have the same axial length. This avoids any weakening of the raceways and avoids imbalances and additional machining expenditure.

In addition, all the windows of the cage can have the same length in the peripheral direction, which facilitates its production.

In an advantageous embodiment, all the windows of the cage are constructed substantially in the same manner and are disposed so as to be distributed uniformly on the periphery of the cage. In particular locally thickened overdimensioned portions of the cage are avoided, and a compact construction is promoted, in this way.

In addition, the axial spacing f of the center of the cage window from the cage edge of the assembly side can be selected to be large in relation to the outer diameter g of the cage, with the following condition being adhered to: f/g greater than 0.275.

In addition, the radius h of the rounding of the cage window can be selected to be very large in relation to the axial length of the cage window i. The following condition is particularly preferably adhered to for this purpose: for PCD less than or equal to 62 mm, h/i is greater than 0.4, and for PCD greater than 62 mm, h/i is greater than 0.46.

By adhering to the above-defined condition, pronounced stress peaks at the cage webs between the windows are avoided.

In addition, the opening diameter j at the assembly side of the cage can be selected to be small in relation to the outer diameter d of the inner joint part, such that d/j is greater than 1.11.

This is advantageous in the case in particular of joints with raceways without an undercut, so-called UF (Undercut Free) joints.

In principle, the sphere center points of the inner spherical face and of the outer spherical face of the cage can coincide. It is however also possible to provide an axial offset between these sphere center points.

It can additionally be provided that the raceway pairs form a single-sided opening angle which is preferably aligned or oriented towards the opening side of the joint. Joints of this type permit larger deflection angles than joints in which the opening angle is aligned oppositely and which are generally characterized by better strength properties.

The above features are suitable primarily for joints having six or seven raceway pairs or balls, with which maximum joint deflection angles of greater than 45° are achieved.

Other features which are considered as characteristic for the invention are set forth in the appended claims.

Although the invention is illustrated and described herein as embodied in a constant-velocity fixed joint, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a diagrammatic sectional view of the section plane A-A of the inner joint part according to the invention viewed in a direction along the joint axis;

FIG. 4 is a diagrammatic sectional view of the inner joint part according to the invention viewed in a direction transverse with respect to the joint axis;

FIG. 5 is a diagrammatic sectional side view of the cage according to the invention;

DESCRIPTION OF THE PREFERRED EMBODIMENTS

Figure 1:
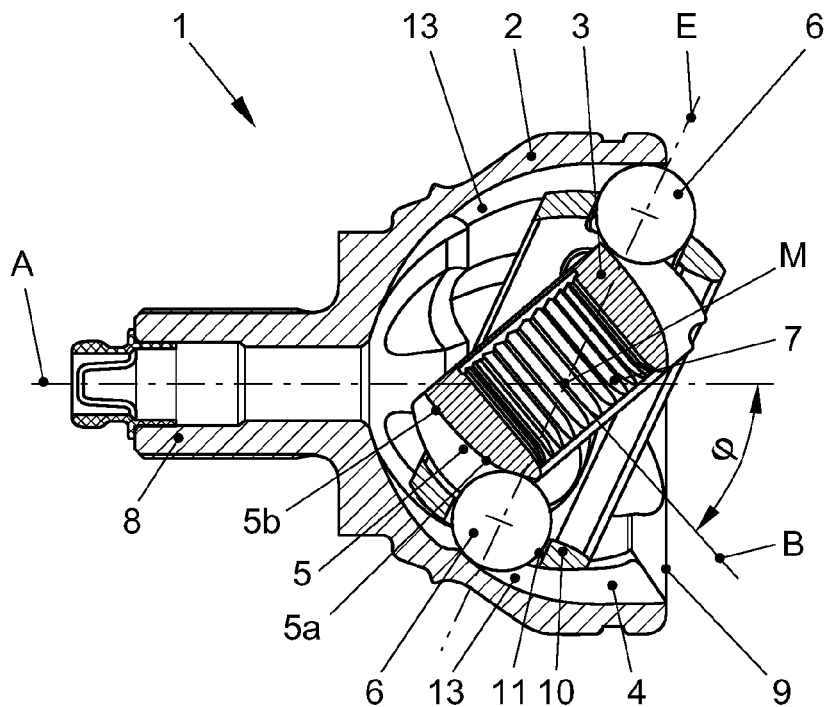
FIG. 1 is a diagrammatic sectional view of an exemplary embodiment of a constant-velocity fixed joint according to the invention.

Referring now to the figures of the drawings and first, particularly, to FIG. 1 thereof, there is shown a constant-velocity fixed joint 1 including an outer joint part 2 and an inner joint part 3. Both the outer joint part 2 and the inner joint part 3 are provided at their spherical peripheral (circumferential) faces which point toward one another with ball raceways 4 and 5 which in each case in pairs hold a ball 6. Here, the inner joint part 3, which by way of example has a central receptacle 7 with a spline toothing for a shaft here, can be pivoted relative to the outer joint part 2 about a deflection center M of the joint. The cross section of the ball raceways 4 and, respectively, 5 is preferably matched to the contour of the balls 6. It is however also possible for at least one of the raceways to be configured such that the associated ball 6 is supported against the respective raceway 4 and 5 via two contact points. This applies for example to elliptical or ogival raceways.

The outer joint part 2 according to the exemplary embodiment has a bell-like shape which encloses the inner joint part 3. The open side of the bell forms a joint opening 9 from which the inner joint part 3 is inserted into the outer joint part 2. A further attachment 8 for a shaft is formed on the outer joint part 2 at the opposite side from the joint opening 9.

A thin-walled cage 10 is disposed between the outer joint part 2 and the inner joint part 3, which cage 10 is illustrated in more detail in FIG. 4. The cage 10, which has a spherical shape at the outside and at the inside, surrounds the inner joint part 3 and is mounted on the outer joint part 2 in the manner of a ball joint. Here, the outer peripheral face 14 and the inner peripheral face 15 of the cage 10 are concentric with respect to one another. The ratio of the cage outer diameter g to the cage inner diameter g' is preferably less than 1.15, that is to say the cage 10 is formed with a relatively small wall thickness.

The cage 10 additionally has windows 11 for holding and guiding the balls 6. The balls 6 are held in a common plane E which, in the event of a deflection of the joint 1 by the deflection angle φ between the axes of the outer joint part 2 and of the inner joint part 3, is set at half the angle.

As FIG. 5 shows, the cage 10 is embodied as a simple annular body with spherical outer and inner peripheral faces 14 and 15. Here, all the windows 11 have the same length b in the peripheral direction. In the illustrated exemplary embodiment, the windows 11 are additionally disposed so as to be distributed uniformly on the periphery and all have the same shape. This permits very simple and cost-effective production. As a result of the lack of further grooves and cutouts on the cage 10, additional machining expenditure and a weakening of the cage 10 is avoided, so that the cage can be embodied such that it is relatively thin.

This is contributed to further in that the radius h of the rounding (corner radius) of the cage window 11 is selected to be relatively large in relation to the axial length i of the cage window 11. This improves the load capacity of the cage webs 17, since the notching effect is reduced. For joints 1 having a pitch circle diameter PCD of the ball center points less than or equal to 62 mm, the ratio h/i is such that h/i is greater than 0.4.

In the case of larger joints with a pitch circle diameter PCD greater than 62 mm, the ratio h/i is greater than 0.46.

It is additionally provided to select the axial spacing f of the center of the cage window 11 from the cage edge 16 of the assembly side in relation to the outer diameter g of the cage 10 such that the ratio f/g is greater than 0.275.

In a modification of the illustrated exemplary embodiment, the spherical outer face 14 and the spherical inner face 15 on the cage 10 can also be disposed with an axial offset with respect to one another. The above wall thickness ratio then refers to the plane in which the balls are guided by the cage.

In order to achieve large deflecting angles at the joint 1, the opening angles of the raceway pairs are formed such that the latter are aligned or open toward the opening side 9 of the joint 1. As can be seen in FIG. 1, with the joint 1 according to the invention, it is possible to obtain deflection angles φ between the joint axis A of the outer joint part and the joint axis B of the inner joint part 3 of 45 degrees and more.

With regard to improving the breaking strength at large deflection angles φ, the raceways 5 on the inner joint part 3 have sections of different curvature, which sections are denoted in FIG. 1 by reference numerals 5$a$ and 5$b$. The two sections 5$a$ and 5$b$ merge into one another in a continuous fashion. The corresponding raceway profile of the associated ball 6 is illustrated in FIG. 8.

Here, the section 5$a$ toward the opening side 9 of the joint 1 has a rolling radius R about the point P which is greater than an imaginary circular arc with the radius r about a point O on the inner part central axis B. The corresponding radial offset between the points O and P is denoted in FIG. 8 by ΔR, so that the following applies: R=r+ΔR. The rolling radius R on the section 5$a$ is smaller than the rolling radius of the section 5$b$ which is situated axially opposite on the inner joint part 3. The section 5$b$ can also have an infinite radius of curvature, that is to say have no undercut.

Figure 8:
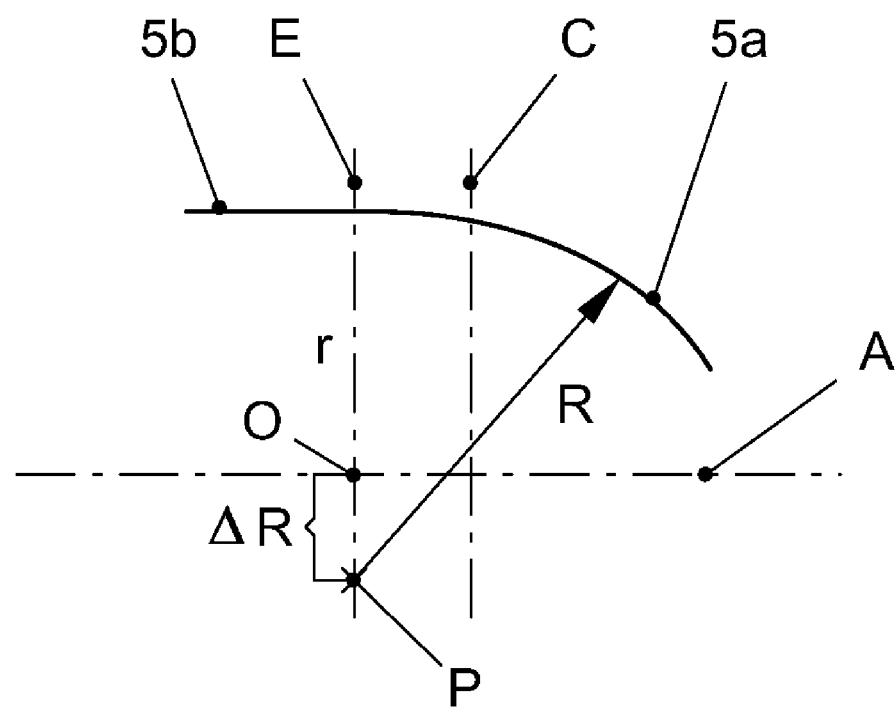
FIG. 8 is a diagram illustrating the profile of a ball raceway on the inner joint part according to the invention.

The section 5$a$ in the direction of the opening side 9 preferably has a raceway profile which lies between an imaginary axially parallel profile and an imaginary circular arc with the radius r about a point on the inner part central axis B, with modifications being possible here from the raceway shape illustrated in FIG. 8. It is possible in particular to use the raceway profiles described in German Patent Application Publication No. DE 102 60 172 A1.

In this way, it is possible to use a relatively thin cage 10 which, during joint rotations at large deflection angles, ensures sufficient guidance over the entire radial offset of the balls 6 which occurs here. A good angle of wrap around the balls 6 is thus ensured at the raceway ends, which has an advantageous effect on the load capacity of the ball raceways 5 and on the breaking strength. Only the raceway profile on the inner joint part 3 has been described above. The raceway profile on the outer joint part 2 is however configured in a mirror-symmetrically analogous manner, so that a high load capacity of the raceways 4 at large deflection angles is also given there. There are therefore corresponding raceway profiles on the outer joint part 2 and on the inner joint part 3.

In practical terms, this is expressed in that, in FIG. 1, the raceway profile 4 and 5 has, at its end on the opposite side from the joint opening 9, a high degree of overlap with the ball 6. As a result of the relatively thin cage 10, it is possible to realize a correspondingly improved angle of wrap with a high degree of overlap even at the side of the joint opening 9. At a deflection angle of 50°, the angle of wrap of the raceway 5 around the ball 6 is in an angle range of more than 115°. On the section 13 of the raceway 4 of the outer joint part 2, the corresponding wrap angle is at least 122°.

For the wall thickness of the cage 10 the exemplary embodiment according to the invention results in values of less than 25% of the diameter of the balls 6. In the exemplary embodiment illustrated here, the value is less than 21%. With regard to sufficient strength of the cage 10, however, values of less than 10% should not be undershot.

The thin cage 10 additionally permits a particularly compact construction of the joint, since the ball center point pitch circle diameter PCD can be configured to be very narrow. In the case of a six-ball joint, the following ratios can be realized.

For PCD greater than 63 mm: $(PCD+d_K)/d_K<4$, and
for PCD less than or equal to 63 mm: $(PCD+d_K)/d_K<4.25$,
where $d_K$ represents the ball diameter.

An axial offset can be provided between the curved sections of the raceways. In addition, an axial offset as a so-called Stuber offset can be provided between the central axis of the spherical outer face of the inner joint part 3 and the center of curvature point P of the section 5a.

In order to further improve the breaking strength at large deflection angles, the following measures have proven to be advantageous on a constant-velocity fixed joint 1 of the above-explained type, through the use of which measures it is possible for the inner joint part 3 to be pivoted into the cage during assembly, and nevertheless for the functional faces, that is to say in particular the ball raceways, to remain optimally formed with regard to their load capacity.

Figure 2:
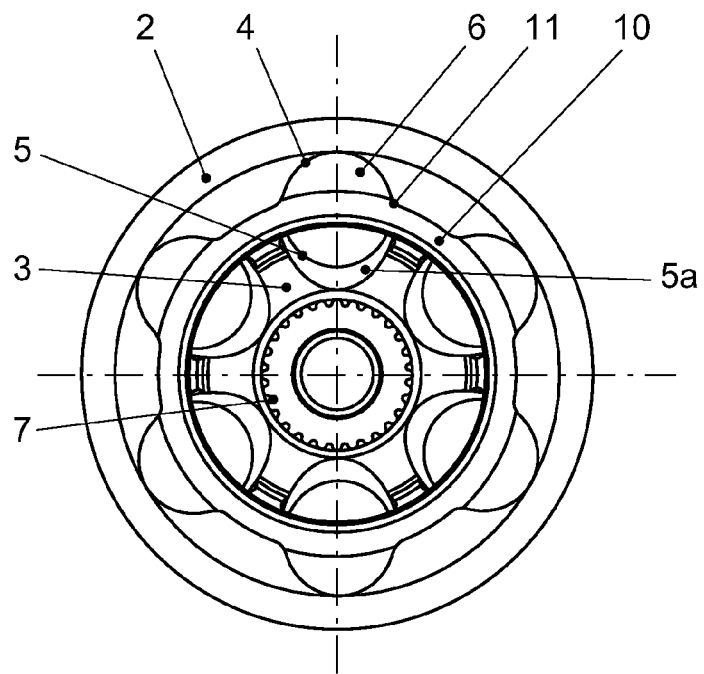
FIG. 2 is diagrammatic elevational view of the opening side or assembly side of the joint shown in FIG. 1.
Figure 6:
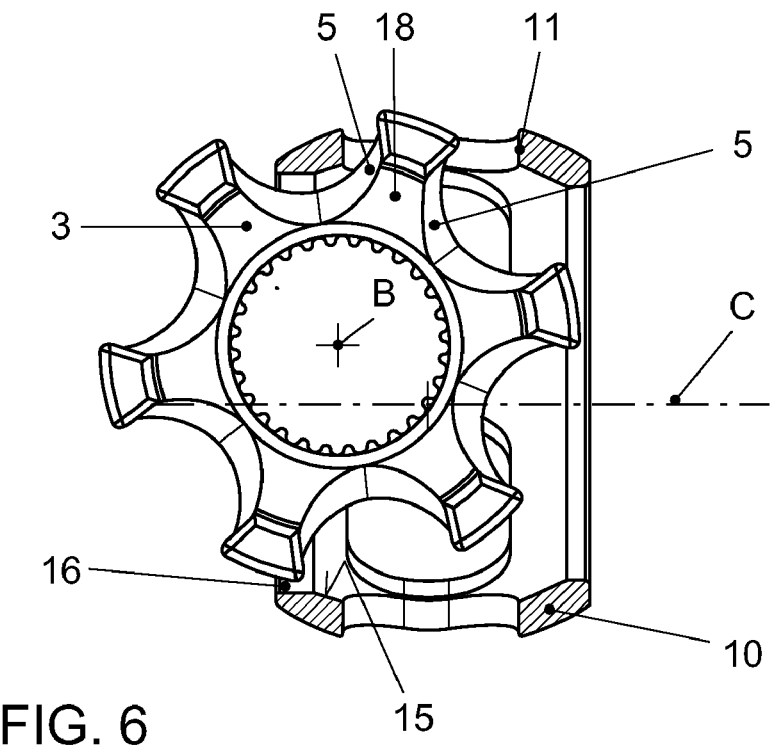
FIG. 6 is diagrammatic view of the cage and of the joint inner part according to the invention during the insertion of the inner joint part into the cage, with a web of the inner joint part engaging into a cage window.
Figure 7:
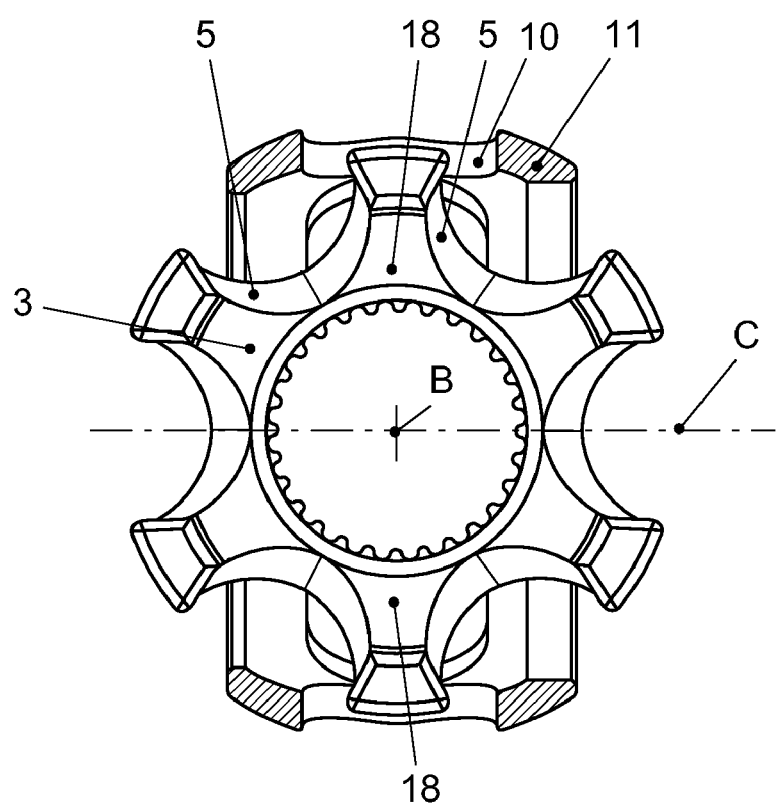
FIG. 7 is diagrammatic view of the cage and of the joint inner part according to the invention after the insertion of the inner joint part into the cage during the centering of the centers of the inner joint part and of the cage before a subsequent pivoting into an axially parallel position.

The pivoting-in is illustrated in FIGS. 6 and 7. As shown in FIG. 6, for this purpose, the inner joint part 3 is angled with its axis B at 90° with respect to the cage 10 with the axis C. During the insertion process illustrated in FIG. 6, one of the webs 18 of the inner joint part 3, which web 18 is delimited in the peripheral direction by two ball raceways 5, engages into a window 11 of the cage 10. As a result, a degree of play is obtained which is such that the opposite web 18 overcomes the undercut formed by the spherical shape of the inner periphery of the cage 10. For this purpose, the cage 10 can if appropriate have a greater opening diameter at its insertion side 16 than at its opposite side. The two components can subsequently, as is shown in FIG. 7, be aligned with respect to one another by superposing the central points of the ball faces on the inner joint part 3 and on the cage 10. The two can then be pivoted into an axially parallel position with respect to one another, which is shown in FIG. 2.

In this assembly routine, in order to further improve the breaking strength without adversely affecting the functional faces, it is favorable if, when the joint is not deflected, in a plane E which intersects the ball centers, the following condition is adhered to at the inner joint part 3:

for PCD less than or equal to 62 mm: $\epsilon/\gamma$ is greater than 1.6, and
for PCD greater than 62 mm: $\epsilon/\gamma$ is greater than 1.8.

Here, $\epsilon$ is the angle (raceway angle) which encloses the raceway 5 between the points of intersection of the ball diameter with the imaginary inner part outer diameter in relation to the joint axis point of intersection M of the plane E. In contrast, $\gamma$ is the angle (web angle) which encloses the web 18 between the points of intersection of the ball diameter with the imaginary inner part outer diameter with respect to the joint axis point of intersection M of the plane E.

Alternatively or in addition, the following condition is adhered to:

for PCD less than or equal to 62 mm: t/d is greater than 0.16, and
for PCD greater than 62 mm: t/d is greater than 0.168

Here, t is the depth of the raceway 5, and d is the outer diameter of the inner joint part 3. In this way, all of the webs 18 can be formed in the same manner. In addition, all the webs 18 have a sufficient functional face on the outer periphery of the inner joint part 3. In addition, the load capacity of the cage 10 is improved, since the axial length of the cage 10 on the assembly side 19 can be increased.

The axial spacing f of the center of the cage window 11 from the cage edge of the assembly side 16 can be selected to be large in relation to the outer diameter g of the cage 10, according to the following relationship: f/g is greater than 0.275.

The above-explained constant-velocity fixed joint 1 according to the exemplary embodiment including its modifications is characterized by a high breaking strength at large deflection angles, since in particular weakenings on the functional faces of the inner joint part are avoided.

With the joint that is embodied as illustrated, deflection angles of greater than 50° can be achieved.

At the raceway ends, a large wrap angle around the balls is obtained, which is advantageous for the load capacity of the raceways.

In addition, simple pivoting of the inner joint part into the cage is possible. On account of its simple shape, the latter is additionally favorable to produce. The cage can additionally be formed with a relatively small thickness.

The constant-velocity fixed joint is additionally characterized by a compact construction.

The invention has been explained above on the basis of an exemplary embodiment. The invention is however not restricted to the exemplary embodiment but rather includes all the embodiments defined by the patent claims.

LIST OF REFERENCE SYMBOLS

1 Constant-velocity fixed joint
2 Outer joint part
3 Inner joint part
4 Ball raceway of the outer joint part
5 Ball raceway of the inner joint part
5a Outer section of the ball raceway 5
5b Inner section of the ball raceway 5
6 Ball
7 Shaft receptacle
8 Receptacle
9 Joint opening
10 Cage
11 Window
13 Raceway end section on the outer joint part
14 Outer peripheral face of the cage
15 Inner peripheral face of the cage
16 Insertion opening on the cage
17 Web on cage
18 Web on inner joint part
a Axial length of the web 18
b Length of the cage window in the peripheral direction
d Outer diameter of the inner joint part (intersected through the ball center of the inner joint part)
$d_K$ Ball diameter f Spacing cage window center—edge of the insertion opening on the cage
g Outer diameter of the cage
g' Inner diameter of the spherical inner peripheral face of the cage
h Radius of rounding of the cage window
i Axial length of the cage window
j Diameter of the insertion opening on the cage
r Radius
t Depth of the raceways on the inner joint part in the plane E
A Axis of the outer joint part
B Axis of the inner joint part
C Axis of the cage
E Plane
PCD Pitch circle diameter of the ball center points when the joint is not deflected
O Point on the axis of the inner joint part
P Center point of curvature
R Radius
γ Web angle at the outer diameter of the inner joint part intersected through the ball centers at right angles to the axis B when the joint is not deflected, with the angle being related to the points of intersection between the theoretical ball diameter and the theoretical outer diameter of the inner joint part
ε Raceway angle at the outer diameter of the inner joint part, intersected through the ball centers at right angles to the axis B when the joint is not deflected, with the angle being related to the points of intersection between the theoretical ball diameter and the theoretical outer diameter of the inner joint part
φ Deflection angle
ΔR Radial offset

What is claimed is:

1. A constant-velocity fixed joint, comprising:
an outer joint part having an inner periphery, said outer joint part having ball raceways provided at said inner periphery;
an inner joint part having an outer periphery defining an imaginary inner part outer diameter and an inner joint part axis, said inner joint part having ball raceways provided at said outer periphery and having webs separating said ball raceways of said inner joint part at said outer periphery from one another;
said ball raceways of said outer joint part and said ball raceways of said inner joint part being disposed opposite one another for forming raceway pairs;
balls having respective balls centers and ball diameters, said balls being held in said raceway pairs;
a cage disposed between said outer joint part and said inner joint part, said cage having windows formed therein for holding said balls;
said inner joint part and said cage being configured such that at least one of said webs of said inner joint part can be inserted into one of said windows of said cage for assemblability;
said joint inner part, when not deflected, being configured to meet the following conditions in a plane intersecting said ball centers:
for PCD at most 62 mm: ε/γ greater than 1.6 and
for PCD greater than 62 mm: ε/γ greater than 1.8 with
PCD being a pitch circle diameter through the ball centers;
ε being an angle enclosing one of said ball raceways of said inner joint part between points of intersection of one of the ball diameters with the imaginary inner part outer diameter with respect to a point of intersection of the inner joint part axis and the plane intersecting the ball centers; and
γ being an angle enclosing one of said webs between points of intersection of corresponding ones of the ball diameters with the imaginary inner part outer diameter with respect to the point of intersection of the inner joint part axis and the plane intersecting the ball centers.

2. The constant-velocity fixed joint according to claim 1, wherein said inner joint part is configured to meet the following conditions:
for PCD at most 62 mm: t/d greater than 0.16 and
for PCD greater than 62 mm: t/d greater than 0.168 where
PCD is the pitch circle diameter through the ball centers;
t is a depth of said ball raceways of said inner joint part; and
d is an outer diameter of said inner joint part.

3. The constant-velocity fixed joint according to claim 1, wherein:
said cage has an outer diameter and has an edge on an assembly side thereof;
said windows of said cage have respective centers;
said cage is configured such that an axial spacing of the centers of said windows from said edge of said cage on the assembly side in relation to the outer diameter of said cage is such that:
f/g is greater than 0.275 where
f is the axial spacing of the centers of said windows from said edge of said cage on the assembly side; and
g is the outer diameter of said cage.

4. The constant-velocity joint according to claims 1, wherein:
said windows of said cage have an axial length and are formed with a radius of rounding;
said cage is configured to meet the following conditions:
for PCD at most 62 mm: h/i greater than 0.4 and
for PCD greater than 62 mm: h/i greater than 0.46 where
PCD is the pitch circle diameter through the ball centers;
h is the radius of rounding of said windows of said cage; and
i is the axial length of said windows of said cage.

5. The constant-velocity fixed joint according to claim 1, wherein:
said cage has an opening diameter j on an assembly side thereof; and
said inner joint part has an outer diameter d such that d/j is greater than 1.11.

6. The constant-velocity fixed joint according to claim 1, wherein said cage has an outer spherical face and an inner spherical face defining respective sphere center points such that the sphere center points have an axial offset.

7. The constant-velocity fixed joint according to claim 1, wherein said raceway pairs form a one-sided opening angle.

8. The constant-velocity fixed joint according to claim 1, wherein:
said inner joint part has a joint opening side;
said ball raceways of said inner joint part have sections with respective different curvatures merging into one another;
said sections of said ball raceways of said inner joint part include an end section with a given raceway profile; and
said given raceway profile extends in a direction toward the joint opening side such that said given raceway profile lies between an imaginary axially parallel profile and an imaginary circular arc about a point on the inner joint part axis.

9. The constant-velocity fixed joint according to claim 1, wherein said cage has a wall thickness of less than 25% of said ball diameters.

10. The constant-velocity fixed joint according to claim 1, wherein said cage has a wall thickness of less than 21% of said ball diameters.

11. The constant-velocity fixed joint according to claim 1, wherein:
   said cage defines a guide plane for said balls, said cage has a cage outer diameter and a cage inner diameter; and
   a ratio of said cage outer diameter to said cage inner diameter in the guide plane for said balls is less than 1.15.

12. The constant-velocity fixed joint according to claim 1, wherein:
   said outer joint part, said inner joint part, said cage and said balls form a six-ball joint configured to meet the following conditions:
   for PCD greater than 63 mm: $(PCD+d_K)/d_K<4$ and
   for PCD at most 63 mm: $(PCD+d_K)/d_K<4.25$ where
   $d_K$ is a ball diameter; and
   PCD is the pitch circle diameter through the ball centers.

13. The constant-velocity fixed joint according to claim 1, wherein:
   said outer joint part defines an outer joint part axis and a joint opening side;
   said ball raceways of said outer joint part have sections with respective different curvatures merging into one another;
   said sections of said ball raceways of said outer joint part include an end section opposite said joint opening side; and
   said end section has a given raceway profile configured such that said given raceway profile lies between an imaginary axially parallel profile and an imaginary circular arc about a point on the outer joint part axis.

14. The constant-velocity fixed joint according to claim 1, wherein said outer joint part and said inner joint part have a maximum deflection angle in operation of greater than 50°.

* * * * *